(12) United States Patent
Hegde et al.

(10) Patent No.: US 10,228,822 B2
(45) Date of Patent: Mar. 12, 2019

(54) OPTIMAL VISUALIZATION OF SYSTEMS WITH LARGE QUANTITY OF TECHNICAL SERVICER INSTANCES

(71) Applicant: SAP SE, Walldorf (DE)

(72) Inventors: Vikas Ganapati Hegde, Bangalore (IN); Seshadri Chatterjee, Kolkata (IN)

(73) Assignee: SAP SE, Walldorf (DE)

( * ) Notice: Subject to any disclaimer, the term of this patent is extended or adjusted under 35 U.S.C. 154(b) by 599 days.

(21) Appl. No.: 14/947,613

(22) Filed: Nov. 20, 2015

(65) Prior Publication Data

US 2017/0147668 A1    May 25, 2017

(51) Int. Cl.
  *G06F 3/0482*    (2013.01)
  *G06F 17/30*    (2006.01)

(52) U.S. Cl.
  CPC .................................. *G06F 3/0482* (2013.01)

(58) Field of Classification Search
  USPC .......................................................... 707/723
  See application file for complete search history.

(56) References Cited

U.S. PATENT DOCUMENTS

| | | | | |
|---|---|---|---|---|
| 9,721,086 B2* | 8/2017 | Shear | ...................... | H04L 63/20 |
| 2003/0046421 A1* | 3/2003 | Horvitz | ................ | G06Q 10/107 |
| | | | | 709/238 |
| 2004/0143636 A1* | 7/2004 | Horvitz | ................ | G05B 19/404 |
| | | | | 709/207 |
| 2004/0236719 A1* | 11/2004 | Horvitz | ................ | G06N 99/005 |
| 2006/0010217 A1* | 1/2006 | Sood | ....................... | H04L 51/12 |
| | | | | 709/206 |
| 2006/0184410 A1* | 8/2006 | Ramamurthy | ......... | G06Q 10/10 |
| | | | | 706/8 |
| 2007/0253412 A1* | 11/2007 | Batteram | .......... | H04L 29/06027 |
| | | | | 370/389 |
| 2010/0161778 A1* | 6/2010 | Guinard | ................ | G06F 9/5044 |
| | | | | 709/222 |
| 2012/0221961 A1* | 8/2012 | Reynolds | ............. | G06Q 10/107 |
| | | | | 715/752 |
| 2013/0080641 A1* | 3/2013 | Lui | ........................ | H04L 67/10 |
| | | | | 709/226 |
| 2015/0363733 A1* | 12/2015 | Brown | ............. | G06Q 10/06316 |
| | | | | 705/7.26 |
| 2017/0054828 A1* | 2/2017 | Ling | ....................... | H04L 67/32 |

* cited by examiner

*Primary Examiner* — Cam Linh T Nguyen
(74) *Attorney, Agent, or Firm* — Mintz Levin Cohn Ferris Glovsky and Popeo, P.C.

(57) ABSTRACT

Methods and apparatus, including computer program products, are provided for optimizing information presentation. In one aspect, there is provided method, which may include receiving, by a monitoring engine, one or more messages sent from one or more runtime instances of a system being monitored by the monitoring engine; storing, by the monitoring engine, the received one or more messages; prioritizing, by the monitoring engine, the one or more runtime instances for presentation at a user interface view by determining, based on the received one or more messages, a rating for each of a plurality of categories associated with the one or more runtime instances; selecting, based on the prioritizing, information indicative of the state of the prioritized one or more runtime instances; generating a user interface view including the selected information; and displaying the generated user interface view. Related methods, systems, and articles of manufacture are also disclosed.

19 Claims, 6 Drawing Sheets

OPTIMAL VISUALIZATION OF SYSTEMS WITH LARGE QUANTITY OF TECHNICAL SERVICER INSTANCES

TECHNICAL FIELD

This disclosure relates generally to monitoring system performance.

BACKGROUND

Software based systems have become increasingly complex. Indeed, some large enterprise customers may have multiple systems performing a variety of functions, such as resource planning, lead management, accounting, forecasting, payroll, billing, logistics, and/or the like. As such, if there is an outage or other type of performance issue with a given system, it may affect a company's operations. Moreover, each of these systems may have one or more runtime instances. For example, a runtime instance may represent a runtime object that corresponds to a specific function. To illustrate further, at a given system, there may be a first runtime instance for a database, a second runtime instance for a user interface, and/or any other instance. At a given system, there may also be several or hundreds of these instances during a typical runtime of the system. As such, monitoring software may need to continuously monitor a plurality of systems each having a plurality of instances, all of which may require monitoring.

SUMMARY

Methods and apparatus, including computer program products, are provided for optimizing information presented on a display.

In one aspect, there is provided method, which may include receiving, by a monitoring engine, one or more messages sent from one or more runtime instances of a system being monitored by the monitoring engine; storing, by the monitoring engine, the received one or more messages; prioritizing, by the monitoring engine, the one or more runtime instances for presentation at a user interface view by determining, based on the received one or more messages, a rating for each of a plurality of categories associated with the one or more runtime instances; selecting, based on the prioritizing, information indicative of the state of the prioritized one or more runtime instances; generating a user interface view including the selected information; and displaying the generated user interface view.

In some implementations, the above-noted aspects may further include additional features described herein including one or more of the following. The rating may be determined from at least one metric defined for each of the plurality of categories. A plurality of ratings may be determined for each of the one or more runtime instances. A first ranking may be selected from among the determined plurality of ratings, wherein the plurality of ratings are determined from a first set of categories. A second ranking may be selected from among the determined plurality of ratings, wherein the plurality of ratings are determined from a second set of categories. The plurality of runtime instances may be prioritized based on the values of the first ranking and the second ranking. The first set of categories may include availability, an exception, a performance, and an availability. The second set of categories may include an importance of a runtime instance and/or a role of an administrator assigned to the runtime instance. The selecting may further include selecting, based on the values of the first ranking and the second ranking, the information for presentation. The prioritized one or more runtime instances may be stored in an intermediate cache before the displaying. The one or more messages may include at least a measured value for providing at least one metric for determining the rating. The selecting is updated continuously as additional one or more messages are received and the rating changes.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
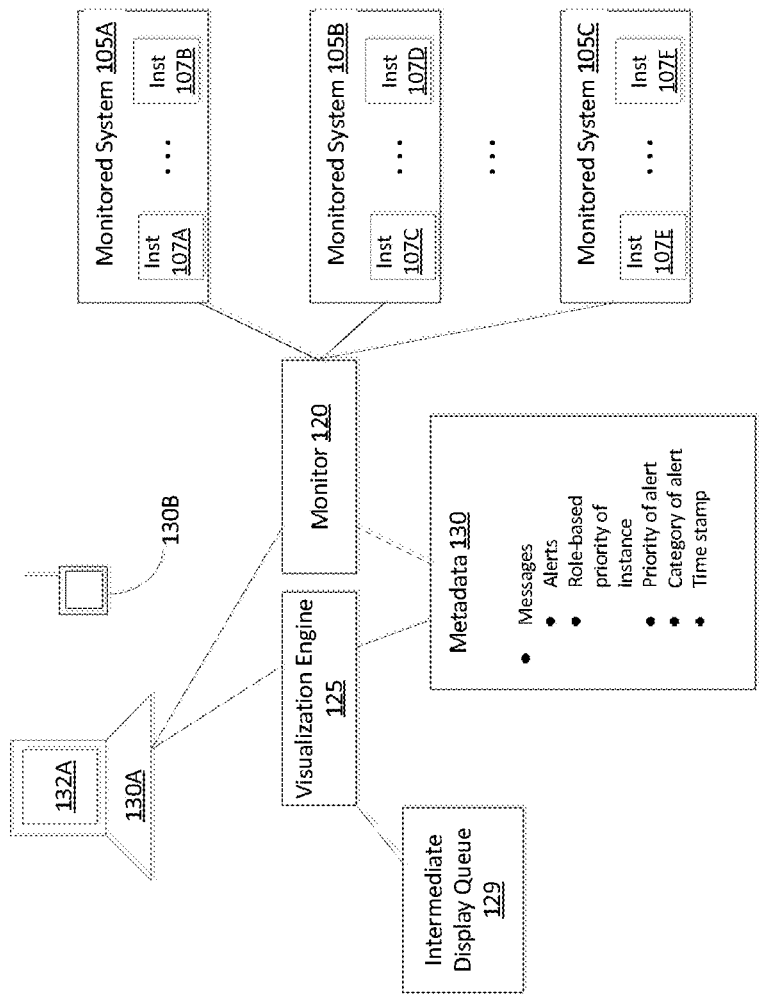
FIG. 1 depicts an example of a system including runtime instances being monitored by a monitor.

In some example embodiments, there is provided a monitoring system that displays information about one or more managed objects, such as systems, instances of the systems, and/or the like.

In some example embodiments, the monitoring system displays the information based on a ranking system including one or more ratings for one or more categories. The ratings for each category may be determined from predefined metrics. For example, the monitoring system may determine, for each of the instances of a system(s), a ranking value determined from a rating in each of a plurality of categories. In this way, the monitoring system can prioritize which system or instance should have its information presented before other systems/instances at a user interface view. In the case of a limited display area, the monitoring system consistent with some of the embodiments disclosed herein may present, in the limited display area, the most important information for a given instance/system based on the ranking.

Some of the categories may relate to dynamic aspects of the system or instance, such as the availability category, while other categories, such as the role of the administrator or role (or importance) of the system or instance may be more static in nature. For example, the ranking may also take into account the importance of the system or instance or the role of its administrator (which may also be indicative of the importance of the system or instance). The administrator role of a production system may be considered more important (and thus of a higher rank) than an administrator of a quality control or developmental system. Likewise, a database instance may have a more central, or crucial, role in the overall operation of the system (as other instances may depend from the database instance's output), when compared to a user interface (or dialog) instance. In this example, the database instance may be defined to have a higher priority role (or of greater importance), when compared to the lower priority user interface instance. In some example embodiments, the role-based priority may be predetermined for the instances of a system. Moreover, these role-based priorities may be considered somewhat static since they can be defined before runtime, although the role-based priorities may be configurable (for example, by a user or machine) at any time including runtime (for example, a priority of a given instance may be changed at any time including runtime). Although the previous example refers to two priorities, there may be other quantities of priority levels for the instances as well.

For the instances being monitored, the information for each of the instances may fall into certain categories, which may be defined and persisted at a metadata store 130 (which is described further). To illustrate, information for a given managed object may be categorized based on the severity and/or time sensitivity of the information or state of the managed object. In addition, information such as metrics for a system or instance may be used to rate the system or instance in one or more categories. The rating may be used to assess whether a given category indicates the system or instance as being in a very serious or time critical ("red") state or condition, not serious or time critical ("green") state or condition, of intermediate concern with respect to time or criticality ("yellow"), or of unknown concern ("grey"). For example, a database instance may correspond to a red status, and the red status may be caused by an issue associated with the availability of the database instance. Specifically, the red status may correspond to an issue that indicates that the database instance is, or is about to be, unavailable as determined by one or more metrics defined for that availability category and measured from time to time. As such, this red status alert may need to be handled with greater speed, when compared to a yellow or other state or condition.

FIG. 1 depicts an example system 100, in accordance with some example embodiments.

System 100 may include one or more systems being monitored (monitored systems) 105A-C. Each of the monitored systems may include one or more runtime instances (also referred to as instances or technical instances) 107A-E.

System 100 may include a monitor 120. The monitor 120 may comprise at least one processor and at least one memory configured to provide the runtime instance monitoring disclosed herein. The monitor 120 may receive information from each of the instances 107A-E. For example, the monitor 120 may include an agent at each of the systems 105A-C, and this agent may generate a message for each of the instances. At system 105A for example, the agent may provide information, such as alerts, status information, measurements such as metrics, state information, and/or the like, for each of the instances 107A-B at system 105A, while another agent at system 105B may provide information, such as alerts, status information, measurements such as metrics, state information, and/or the like, for its corresponding instances. These messages may be provided by each of the instances 107A-E directly to the monitor 120, without the use of an agent as an intermediary. Moreover, the information provided to monitor 120 may be provided on demand (for example, when requested by monitor 120), provided on a certain schedule, and/or provided in response to an event, such as when the status of an instance changes and triggers the sending to the monitor of a message including measured metric information.

In some example embodiments, monitor 120 may continuously monitor instances 107A-E. For example, monitor 120 may repeatedly receive updated status information from the instances 107A-E. Moreover, the monitor 120 may continuously update its priority or ranking of which system or instance has its information presented at the user interface. The messages may represent status information regarding an instance(s), the state of the instances, or other information defined for the instances such as measurements or metrics for a given category at a given system/instance. For example, the message may provide information regarding the availability state, performance state, a configuration state, an exception state, a measured metric, and/or the like at a given instance.

Monitor 120 may store any received information at metadata 130. Metadata 130 may store, for one or more instances and/or systems information. For example, the stored information may include one or more of the following: a system landscape defining the systems and instances being monitored, alerts, status information, information defining the categories, information defining the metrics, information defining the ratings, information defining the rankings, grid-based rankings scheme (see, for example, FIGS. 2-3 below), weights and the like as disclosed herein. Moreover, the stored information may include one or more of the following: a timestamp for any received information, the source of the information (for example, the identity of the instance(s) that generated the information), the role of the instance providing the information, and the category of the information (for example, availability, configuration, performance, exception, and/or the like). In this way, the monitor 120 may rank and thus prioritize the instances 107A-E as well as other instances. Moreover, this ranking may be done continuously during runtime to take into account changes in the state of the instances 107A-E.

In some example embodiments, monitor 120 may rank information for presentation for a given instance and place the prioritized information in an intermediate display queue 129 to enable the visualization engine 125 to fetch, based on available display size and determined rankings, one or more managed objects corresponding to the ranked instances. The visualization engine 125 may comprise at least one processor and at least one memory configured to generate user interface views including a certain quantity of managed objects, such as information associated with certain instances. Moreover, the visualization engine 125 may monitor an available window size, and then determine the available space for viewing one or more ranked instances or their associated alerts stored the intermediate display queue 129. Based on the available space, visualization engine 125 generates a user interface view including a certain quantity of managed objects corresponding to the ranked instances obtained from the intermediate queue. In this way, only the most important information from the most important or critical instances are presented before other less important information. If the view area should change to a smaller view area such as the view area of smart phone 130B, the visualization engine 125 may detect the smaller viewing area and generate a user interface view including fewer prioritized managed objects.

System including monitor 120 may provide a monitoring and alerting infrastructure (MAI). The monitor 120 may enable defining metrics, events, and alerts (collectively referred to as MEA). Moreover, these metrics can be defined to relate to certain categories, such as availability, performance, exception, and configuration. Moreover, the monitor 120 may also enable defining these categories. The following provides some examples related to the availability category:

Message Server Http Availability
System Remote RFC Availability
Message Server Http Availability
System Remote RFC Availability.

For example, an availability metric may at some point trigger a message such as an alert (for example, alert indicating system not available). Like the categories and metrics, the monitor 120 may also allow for definitions of alerts as well. As such, the monitor 120 may enable, for a given system (which is a type of managed object), for the definition of categories, metrics, and alerts. For example, the following metrics can be defined for the availability category:

Instance Local Http Availability: This metric places a local HTTP call from a diagnostic agent against a test page on an instance to see if http requests are being handled.

Instance Local RFC Availability: This metric shows the local RFC availability of the instance. This is measured by performing a local call from a diagnostic agent to the instance.

These metrics may be defined to trigger a message, such as an alert, to be sent from the system or instance to monitor 120. The message may for example indicate instance not available. Although the previous example described availability metric, other types of metrics for other types of categories may be defined as well. For example, the performance category may include metrics such as CPU wait times, available free memory, CPU I/O wait times, and/or other hardware related metrics. Exceptions refer to anomalous or special processing being performed, which can be measured by a metric such as quantity of missing log files for a recovery or a transaction log being held open. The performance category may have metrics such as call response times to a server or web service. The configuration category may have metrics such as a quantity of changes or patches being applied in a given time period.

In some example embodiments, the monitor 120 may define, for a given metric, a threshold value. If at runtime, a measured value exceeds a threshold value, a respective rating value is assigned to the metric. In some instances, two threshold values may be defined for a given metric, so that exceeding the first threshold while remaining within the limits of the second threshold may be defined at the monitor as a yellow rating. This may indicate to a warning that something is about to go wrong (so timely action may need to be taken in order to increase the likelihood of avoiding a worsening of the current state/situation). When the measured value is such that it exceeds the second threshold as well, the assigned rating may be defined as a red rating. This red rating may indicate that something has already gone wrong, so take immediate action. When everything about a measured metric is known to be within defined thresholds (or expected values), the rating may be defined as being green (indicative of acceptable operation). At times, the measurement state of a metric may be unknown. When this is the case, the rating may be defined as grey, which may be defined as an unknown current state. In some implementations, the monitor 120 (or an agent or data collector associated with the monitor 120) may evaluate a metric against a certain or known state. For example, when a ping command to a port succeeds, the respective metric may be rated green, and if the ping fails, then the rating may be defined as a red. In some implementations, a rating may be defined to take certain values based on the value of the metrics. For example, a certain metric value may be mapped to one of four values, such as red, yellow, grey, or green. Moreover, this rating may be dynamic in the sense that it can change continuously during runtime.

Rating of all metrics belonging to a given category can influence the rating of the respective category of a given managed object. For example, a rule may be defined to determine an overall rating of a category of a given managed object. In this example, if at least one metric (which was actively monitored) is rated as red in a category, the rating of the respective managed object in that category may also be defined as red. In short, a rating may be defined as a runtime attribute of a managed object for each of the categories. The rating of a managed object in one category may be defined to not influence the rating of the same managed object in another category.

The monitor 120 may access a persistent store including metadata 130. This persisted metadata may store a plurality of attributes of a plurality of managed systems 105A-C including instances such as an application server instance, a database instance, a host instance, an operating system instance and/or the like. The system 100 including monitor 120 may define an attribute for a given instance and one or more priorities for a system including it instances. A priority may be defined as for example a very high priority, a high priority, a medium priority, and a low priority. Moreover, the priority may configurable by an administrator, so the priority may be a relatively static attribute.

In some example embodiments, there is provided a way of presenting the most important systems or instances based on its ranking value determined from ratings in each of the categories during monitoring of the systems/technical instances. In some example embodiments, the presented systems may also take into account system or instance priority as well as role, such as role of the administrator. For example, the role of an administrator may be production system, development system, quality assurance, or other.

This role may also provide an indication of the priority of the system or instance. For example, a production system or instance would likely be defined to have a higher priority than a quality assurance system or instance.

Figure 2:
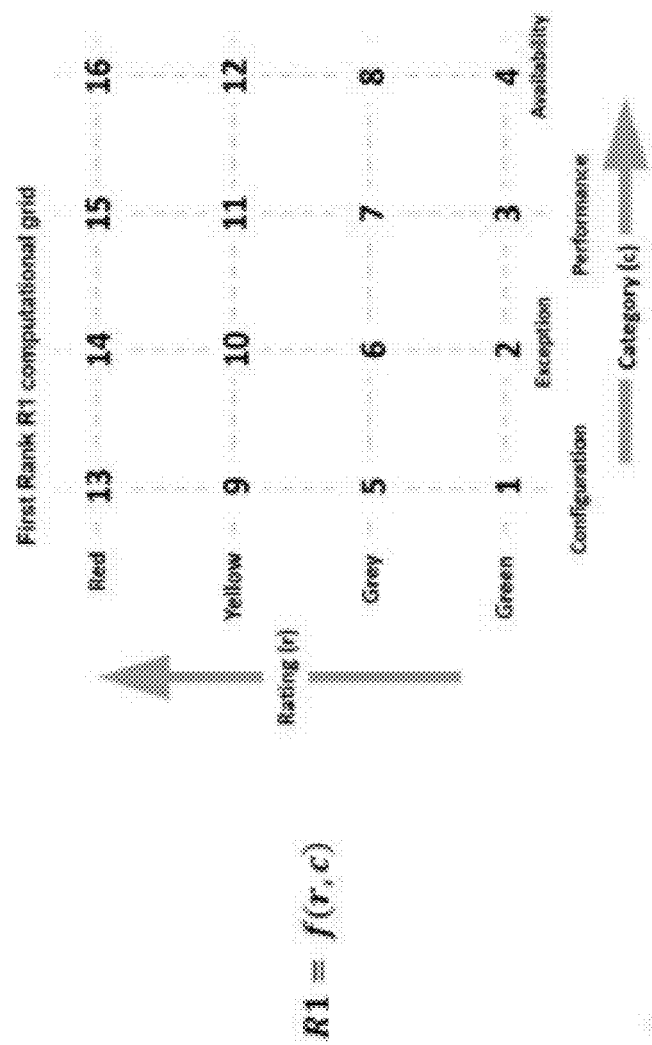
FIG. 2 depicts an example of a grid which can be used to determine a rank for a system or its instances, based on for example attributes such as a rating of a system in a given category.
Figure 3:
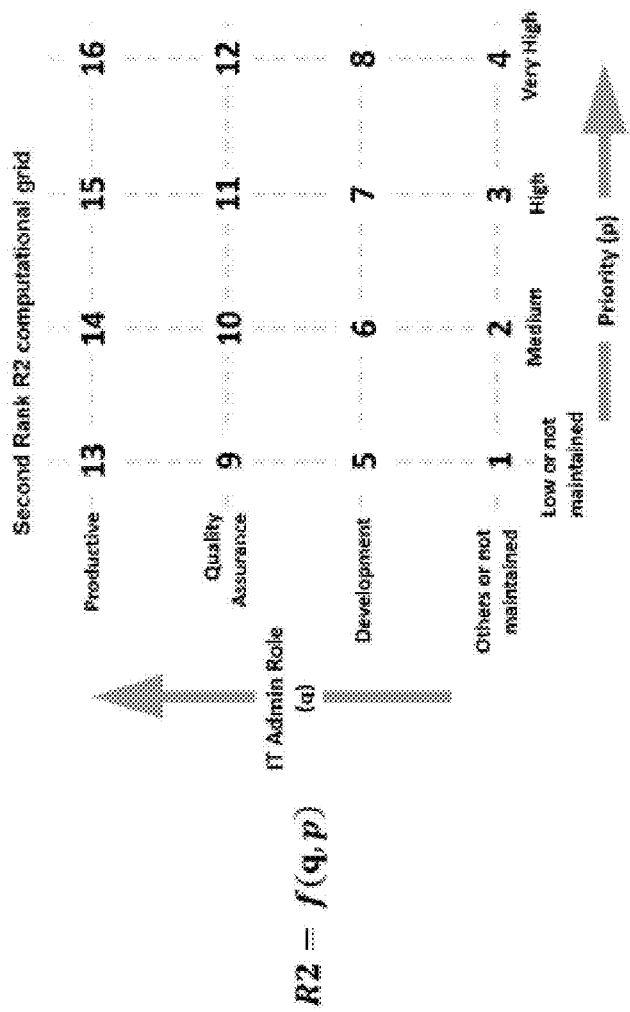
FIG. 3 depicts another example of a grid which can be used to determine a second rank for a system or its instances, based on for example attributes such as priority and the role of the administrator of a system.

FIG. 2 graphically depicts a grid showing four categories, such as configuration, exception, performance, and availability, and corresponding ratings (along the vertical access) for each category. For a given system or instance, monitor 120 may determine the ratings for each of the categories as they change over time (for example, as the measurement metrics for the categories change). The grid may be used to determine that the given system or instance is ranked first, R1, when compared to other systems or instances. In this example, the rank is determined as a function of the rating (r) and categories (c).

The rating of a given system in each of the four categories may be considered. A system can have four ratings. Among these, the highest rating may be selected as its first rank, R1. Given a system A which is assigned a rating (r) of red in the category (c) "availability", a rating of yellow in "performance", red in "exception", and grey in "configuration". The four ratings that are relevant in each of these categories are 16, 11, 14 and 5, as shown in FIG. 2 for example. This system or instance would receive a first rank R1 of 16. Now consider a system B which is assigned a rating (r) of yellow in the category (c) "availability", a rating of red in "performance", green in "exception" and yellow in "configuration". The four rating that are relevant in each of these categories are 12, 15, 2 and 9, for example. In this case, system B would receive a first rank R1 as 15. Using the grid of FIG. 2, it is likely that many systems/instances may get assigned the same rank R1. Accordingly, the system/instance may be assigned a second rank R2 using a grid, such as the grid depicted at FIG. 3. In some example embodiments, the second grid used for the second ranking may be based on more static attributes, such as administrator role and system/instance relative priority or importance.

Figure 4:
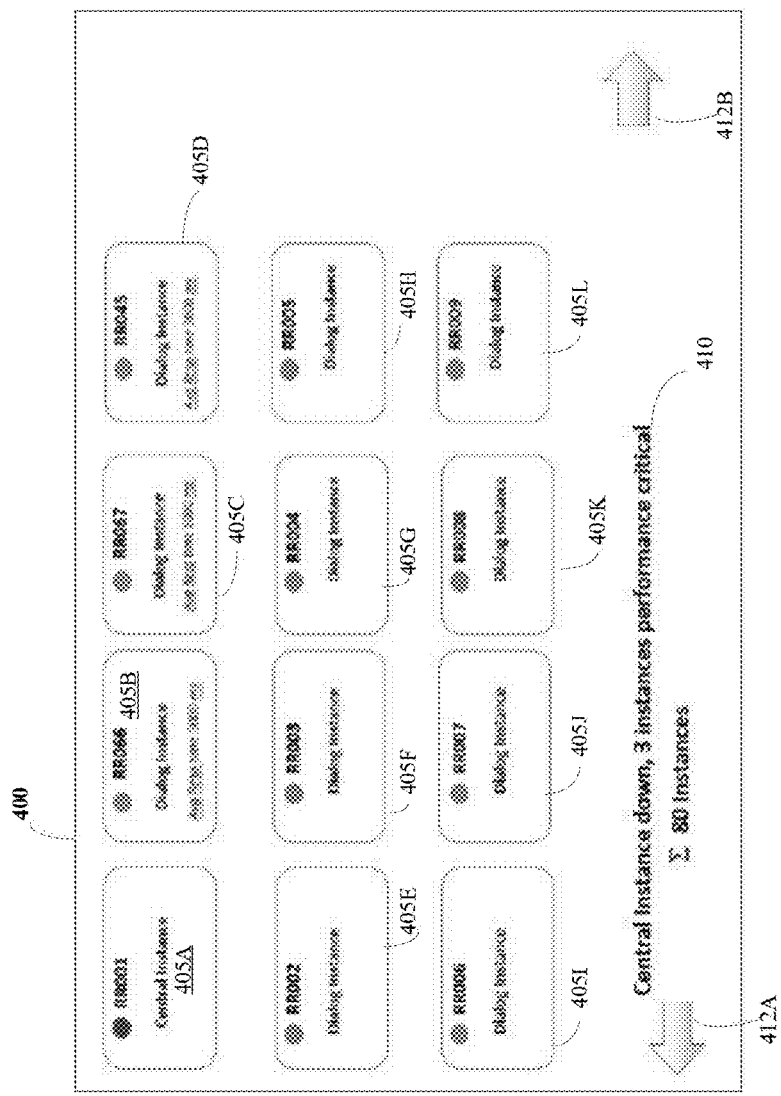
FIG. 4 depicts an example of a user interface view.

FIG. 4 depicts an example of a user interface view 400 listing managed objects, such as systems, instances, and/or the like. In the example of FIG. 4, instances 405A-L are depicted and listed based on the rankings described herein. Each instance may include information or alert information indicating the state of the instance. This information may be sent to the monitor via messages from the system or agents therein. The user interface view 400 may also include summary information 410 representative of how many alerts are stored in the display queue 129, and navigation icons 412A-B to scroll through other alerts that may be present in display queue 129. For example, selecting icon 412B may cause lower priority alerts to be displayed.

Figure 5:
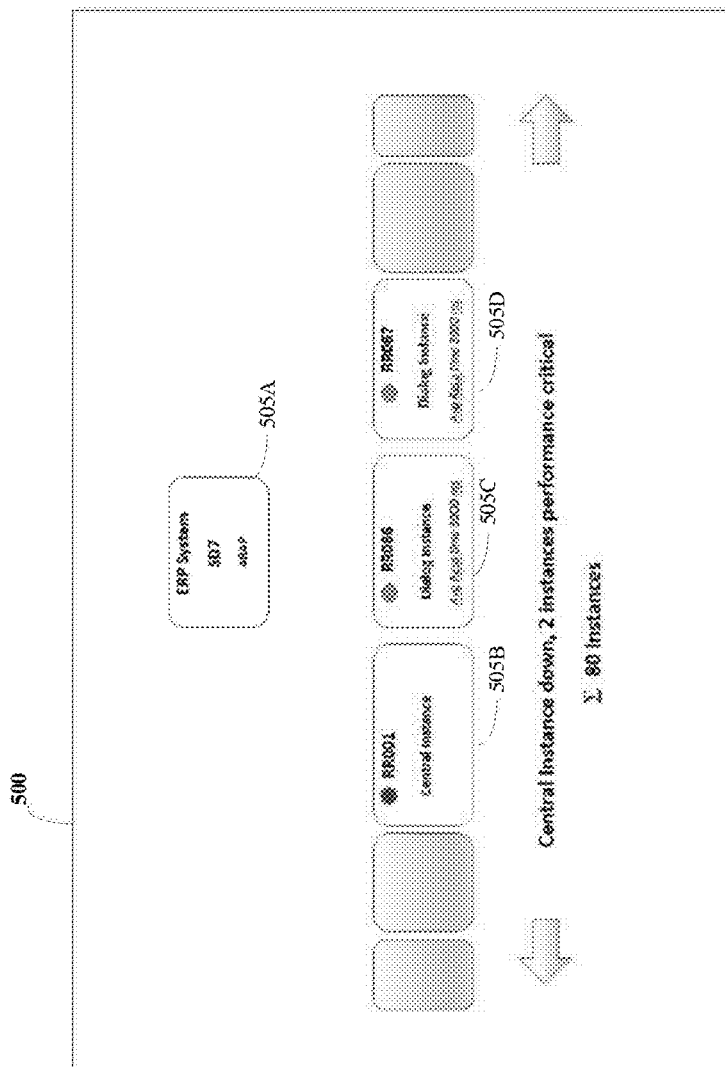
FIG. 5 depicts another example of a user interface view.

FIG. 5 depicts an example an example user interface view 500, which is smaller than user interface view 400 due to a smaller available window/display size. In the example of FIG. 5, visualization engine 125 generates view 500 including alerts 505A-D for 4 instances ranked using the categories and ratings disclosed herein. The user interface view 500 may also include summary information 510 representative of how many alerts are stored in the display queue 129, and navigation icons 512A-B to scroll through other alerts that may be present in display queue 129.

Figure 6:
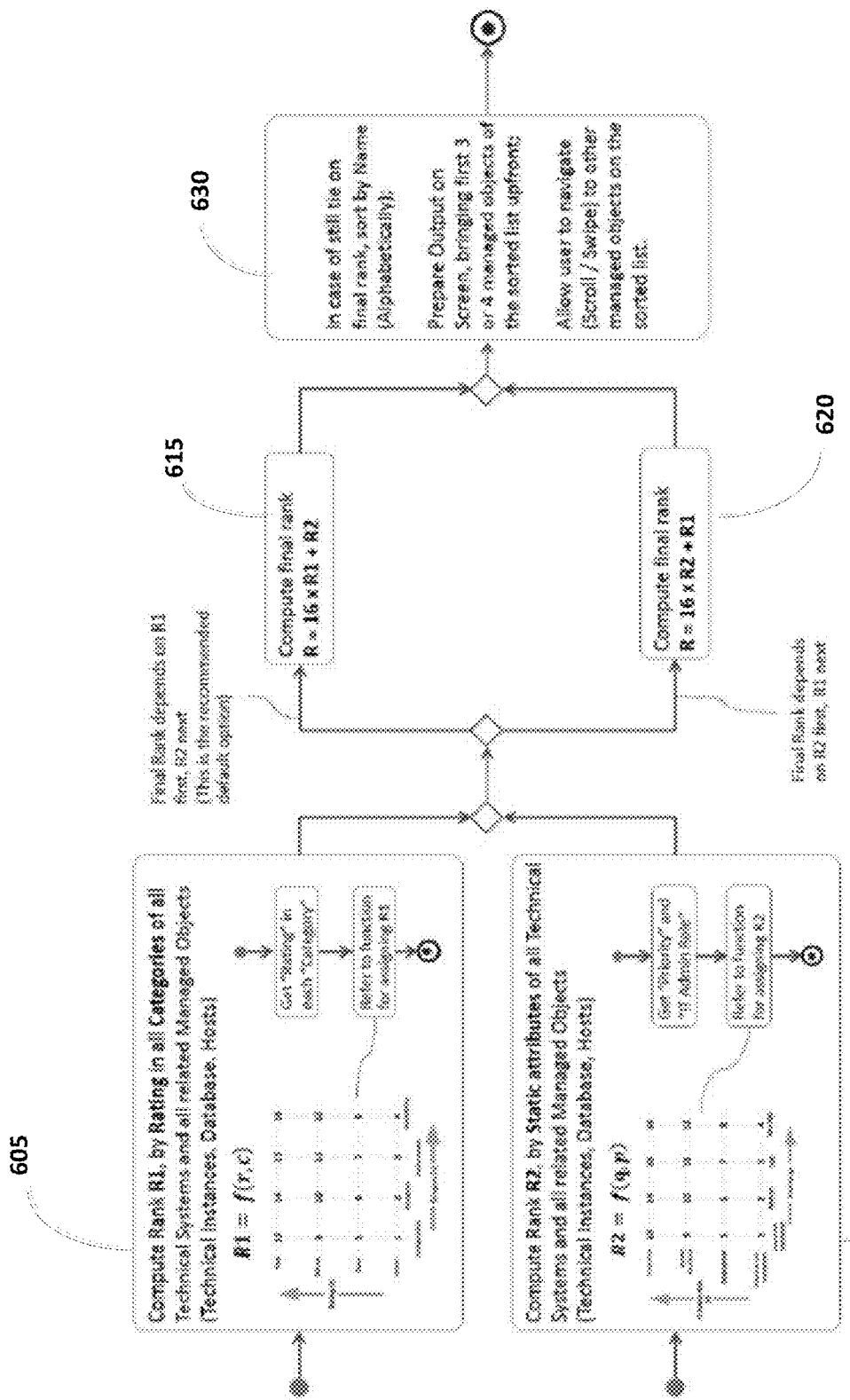
FIG. 6 depicts an example of a process for ranking the system including instances to enable presenting the instances at the user interface views in a priority manner based on grids.

FIG. 6 depicts an example process for ranking and identifying which instances should be presented before others at a display.

At 605, for each system, a rating is determined for each of the categories. For example, for each of the instances of a system, monitor 120 may determine ratings for each of the categories. These ratings may be based on metrics as noted above. The ratings for each category may then be used to rank the instances. For example, the grid of FIG. 2 may be used to rank an instance. If all of the rating for a first instance are for example all less than or equal to 12, then that instance would receive a first rank of yellow. By contrast, a second instance that has a single rating of 15 may receive a red ranking. In this example, the second instance would have a higher R1 rank.

At 610, for each system, another rating is determined for each of the categories. For example, for each of the instances of a system, monitor 120 may determine ratings for each of the categories. At 610, the categories may be different from the categories used at 605. For example, the categories may be more static priorities, such as priority of instance or role of administrator. The ratings may then be used to rank the instances. For example, the grid of FIG. 6 may be used to rank an instance.

At 615, for each system, a combined rank may be determined. For example, the rank determined at 605 may be combined with the rank determined at 610. In the example of FIG. 6, the final rank for a given instance is determined based on the following:

$$R=a(R1,R2)=16 \times R1+R2$$

The value of 16 provides a weighting, although other weight values greater than 16 may be used as well. In this example, the R1 is weighted more heavily than R2 (which provides a so-called "tie-breaker. A system A receiving a higher R1 than another system B would also receive a higher final rank R than that other system B. A weight value lower than 16 would not ensure this. On the other hand, a higher weight value does not harm, though it may not add any merit either so long as the grid has 16 values. More generically, if the grid for R1 was, n by n, the weight of R1 would also be greater than or equal to the n by n in the computation of final rank R.

At 620, another final rank may be determined for each system. For example, the rank determined at 610 may be weighted and then combined with the rank determined at 605. In the example of FIG. 6, the final rank for a given instance is determined based on the following:

$$R=b(R1,R2)=16 \times R2+R1$$

The value of 16 provides a weighting, although other weight values greater than 16 may be used as well. In this example, R2 is weighed more heavily than R1, and provides a so-called "tie-breaker" among R2s. For example, a system A receiving higher R2 than another system 'B' would also receive a higher final rank R than that other system B. A weight value lower than 16 would not ensure this. On the other hand, a higher weight value does not harm, though it may not add any merit either so long as the grid has 16 values. More generically, if the grid for R2 was, n by n, the weight of R2 would also be greater than or equal to the n by n in the computation of final rank R.

At this point, the systems, such as instances, managed objects, and/or the like, may be sorted based on the ranking determined at 615. At 630, one or more of the sorted systems may then be selected for display. If the sorted systems provide a tie among two or more systems, then the monitor 120 may pick one at random (or use another decision function such as alphabetical). Referring again to FIGS. 1 and 4, the one or more sorted systems may be placed in an intermediate cache 129. The managed objects (which represent the systems or instances ranked at 630) may be presented in sequence based on the rankings. As the rankings include dynamic information, the monitoring may include continuously updating the ranking and thus the one or more of the sorted systems. Moreover, if at FIG. 4, a user selects to view another page, the subsequent page may then present the objects based on the sorting performed at FIG. 6.

To illustrate further, instance 107A (FIG. 1) may receive, based on the grid of FIG. 2, an R1 ranking value of 16 (as determined at 605) and an R2 ranking value of 1. In this example, the final rank R value of instance 107A may be determined, at 615, as 257. On the other hand, instance 107C may receive a first rank value R1 of 15 and a second rank R2 of 16, so the final rank R value of instance 107C may be determined, at 615, as 256. As such, instance 107A may be queued for presentation before instance 107C. Moreover, this example demonstrates that the ranking is influenced more by the dynamic rating and category combination of 605 than by the more static aspects of 610.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A method comprising:
   receiving, by a monitoring engine, one or more messages sent from one or more runtime instances of a system being monitored by the monitoring engine;
   storing, by the monitoring engine, the received one or more messages;
   prioritizing, by the monitoring engine, the one or more runtime instances for presentation at a user interface view by determining, based on the received one or more messages, a rating for each of a plurality of categories associated with the one or more runtime instances;
   storing, information indicative of the prioritized one or more runtime instances in an intermediate cache before the displaying;
   selecting, from the intermediate cache and by a visualization engine, a portion of the information indicative of a state of the prioritized one or more runtime instances, the selecting based on the prioritizing and an available display size;
   generating a user interface view including the selected portion of the information; and
   displaying the generated user interface view.

2. The method of claim 1, wherein the rating is determined from at least one metric defined for each of the plurality of categories.

3. The method of claim 1, wherein a plurality of ratings are determined for each of the one or more runtime instances.

4. The method of claim 3, wherein a first ranking is selected from among the determined plurality of ratings, wherein the plurality of ratings are determined from a first set of categories.

5. The method of claim 4, wherein a second ranking is selected from among the determined plurality of ratings, wherein the plurality of ratings are determined from a second set of categories.

6. The method of claim 5, wherein the plurality of runtime instances are prioritized based on the values of the first ranking and the second ranking.

7. The method of claim 6, wherein the first set of categories include availability, an exception, a performance, and an availability.

8. The method of claim 7, wherein the second set of categories include an importance of a runtime instance and/or a role of an administrator assigned to the runtime instance.

9. The method of claim 5, wherein the selecting further comprises:
   selecting, based on the values of the first ranking and the second ranking, the information for presentation.

10. The method of claim 1, wherein the one or more messages include at least measured value for providing at least one metric for determining the rating.

11. The method of claim 1, wherein the selecting is updated continuously as additional one or more messages are received and the rating changes.

12. A system comprising:
    at least one processor and at least one memory including code which when executed causes operations comprising:
    receiving, by a monitoring engine, one or more messages sent from one or more runtime instances of a system being monitored by the monitoring engine;
    storing, by the monitoring engine, the received one or more messages;
    prioritizing, by the monitoring engine, the one or more runtime instances for presentation at a user interface view by determining, based on the received one or more messages, a rating for each of a plurality of categories associated with the one or more runtime instances;
    storing, information indicative of the prioritized one or more runtime instances in an intermediate cache before the displaying;
    selecting, from the intermediate cache and by a visualization engine, a portion of the information indicative of a state of the prioritized one or more runtime instances, the selecting based on the prioritizing and an available display size;
    generating a user interface view including the selected portion of the information; and
    displaying the generated user interface view.

13. The system of claim 12, wherein the rating is determined from at least one metric defined for each of the plurality of categories.

14. The system of claim 12, wherein a plurality of ratings are determined for each of the one or more runtime instances.

15. The system of claim 14, wherein a first ranking is selected from among the determined plurality of ratings, wherein the plurality of ratings are determined from a first set of categories.

16. The system of claim 15, wherein a second ranking is selected from among the determined plurality of ratings, wherein the plurality of ratings are determined from a second set of categories.

17. The system of claim 16, wherein the plurality of runtime instances are prioritized based on the values of the first ranking and the second ranking.

18. The system of claim 17, wherein the first set of categories include availability, an exception, a performance, and an availability.

19. A non-transitory computer-readable storage medium including program code which when executed causes operations comprising:
    receiving, by a monitoring engine, one or more messages sent from one or more runtime instances of a system being monitored by the monitoring engine;
    storing, by the monitoring engine, the received one or more messages;
    prioritizing, by the monitoring engine, the one or more runtime instances for presentation at a user interface view by determining, based on the received one or more messages, a rating for each of a plurality of categories associated with the one or more runtime instances;
    storing, information indicative of the prioritized one or more runtime instances in an intermediate cache before the displaying;

selecting, from the intermediate cache and by a visualization engine, a portion of the information indicative of a state of the prioritized one or more runtime instances, the selecting based on the prioritizing and an available display size;
generating a user interface view including the selected portion of the information; and
displaying the generated user interface view.

\* \* \* \* \*